(12) United States Patent
Kasik et al.

(10) Patent No.: US 10,176,520 B2
(45) Date of Patent: Jan. 8, 2019

(54) PRODUCT VISUALIZATION SYSTEM

(71) Applicant: The Boeing Company, Chicago, IL (US)

(72) Inventors: David Joseph Kasik, Sammamish, WA (US); Christopher J. Senesac, Daniel Island, SC (US)

(73) Assignee: The Boeing Company, Chicago, IL (US)

( * ) Notice: Subject to any disclaimer, the term of this patent is extended or adjusted under 35 U.S.C. 154(b) by 718 days.

(21) Appl. No.: 14/793,240

(22) Filed: Jul. 7, 2015

(65) Prior Publication Data

US 2017/0011451 A1 Jan. 12, 2017

(51) Int. Cl.
G06Q 30/06 (2012.01)
G06T 15/00 (2011.01)
(Continued)

(52) U.S. Cl.
CPC ......... G06Q 30/0643 (2013.01); G06T 15/00 (2013.01); G06T 17/10 (2013.01); G06T 19/00 (2013.01); G06T 2200/04 (2013.01)

(58) Field of Classification Search
CPC .. G06F 3/04815; G06F 3/04842; G06F 17/50; G06F 17/30061; G06T 19/20;
(Continued)

(56) References Cited

U.S. PATENT DOCUMENTS 6,339,767 B1 * 1/2002 Rivette ............. G06F 17/30011
707/781
6,933,946 B1 * 8/2005 Silva ....................... G06T 1/60
345/582
(Continued)

FOREIGN PATENT DOCUMENTS

CA 2839913 A1 9/2014
CA 2839914 A1 9/2014
(Continued)

OTHER PUBLICATIONS

Extended European Report Search, dated Nov. 18, 2016, regarding Application No. EP16177801.4, 11 pages.
(Continued)

Primary Examiner — Sultana M Zalalee
(74) Attorney, Agent, or Firm — Yee & Associates, P.C.

(57) ABSTRACT

A method and apparatus for displaying a product. The three-dimensional model includes objects and a spatial relationship of the objects to each other. A group of the objects in the three-dimensional model is identified based on a policy applied to a user input selecting a portion of the product and assigns a value to a group of attributes associated with the group of the objects. The value assigned to the group of the attributes indicates that the group of the objects is to be displayed on the display system. Other objects in the objects having the attributes without the value are not displayed. The attributes associated with the objects are outputted in which the group of the objects is displayed in three dimensions on the display system using the attributes associated with the objects, enabling a desired level of performance in visualizing the three-dimensional model of the product.

21 Claims, 9 Drawing Sheets

(51) Int. Cl.
*G06T 19/00* (2011.01)
*G06T 17/10* (2006.01)

(58) Field of Classification Search
CPC ....... G06T 17/00; G06T 19/00; G06T 19/003; G06T 7/0004; G06T 7/60
See application file for complete search history.

(56) References Cited

U.S. PATENT DOCUMENTS

| | | | |
|---|---|---|---|
| 8,314,789 B2 | 11/2012 | Fitzmaurice et al. | |
| 8,314,790 B1* | 11/2012 | Zeiger | G06T 13/00 345/419 |
| 9,053,254 B2 | 6/2015 | Carter et al. | |
| 2004/0179043 A1 | 9/2004 | Viellescaze et al. | |
| 2004/0217956 A1* | 11/2004 | Besl | G06T 15/00 345/419 |
| 2005/0104880 A1* | 5/2005 | Kawahara | G06F 3/04815 345/419 |
| 2007/0013709 A1* | 1/2007 | Charles | G06F 17/50 345/581 |
| 2007/0185874 A1* | 8/2007 | Tofinetti | H04L 41/0893 |
| 2008/0052046 A1* | 2/2008 | Botvinnik | G06F 17/5004 703/1 |
| 2008/0303746 A1* | 12/2008 | Schlottmann | G07F 17/32 345/1.2 |
| 2009/0138139 A1* | 5/2009 | Tsai | G06Q 10/06 701/3 |
| 2009/0248545 A1* | 10/2009 | Robinson | G06Q 10/06 705/26.1 |
| 2010/0091018 A1* | 4/2010 | Tatarchuk | G06T 13/20 345/423 |
| 2013/0006409 A1* | 1/2013 | Evans | G06F 17/50 700/107 |
| 2013/0132373 A1* | 5/2013 | Huang | G06F 17/50 707/722 |
| 2013/0132432 A1* | 5/2013 | Carter | G06F 17/50 707/770 |
| 2014/0245206 A1 | 8/2014 | Senesac | |
| 2014/0257552 A1 | 9/2014 | Senesac et al. | |
| 2014/0259596 A1 | 9/2014 | Senesac et al. | |
| 2014/0282183 A1 | 9/2014 | Senesac | |
| 2015/0123993 A1* | 5/2015 | Ohba | G09G 5/00 345/629 |

FOREIGN PATENT DOCUMENTS

| | | |
|---|---|---|
| EP | 2778073 A3 | 9/2014 |
| EP | 2784615 A2 | 10/2014 |
| WO | 2014133675 A1 | 9/2014 |
| WO | 2014137486 A2 | 9/2014 |

OTHER PUBLICATIONS

Dietrich et al., "Massive Model Rendering Techniques," IEEE Computer Graphics and Applications, vol. 27, No. 6, Nov.-Dec. 2007, 18 pages.
"About Hiding Elements in a View," Autodesk Help, Revit Products, dated Apr. 14, 2015, 4 pages. https://knowledge.autodesk.com/support/revit-products/learn-explore/caas/CloudHelp/cloudhelp/2015/ENU/Revit-DocumentPresent/files/GUID-A1AC5BC6-5BE5-4704-994F-15E086E2F5B1-htm.html.
Senesac, "Massive Model Visualization (MMV) at Boeing," Global Product Data Interoperability Summit 2015, 25 pages.
Correa et al., "Visibility-Based Prefetching for Interactive Out-Of-Core Rendering," IEEE Symposium on Parallel and Large-Data Visualization and Graphics, Seattle, Washington, Oct. 20-21, 2003, 8 pages.
Aliaga et al., "MMR: an interactive massive model rendering system using geometric and image-based acceleration," Symposium on Interactive 3D Graphics, Feb. 2000, 10 pages.
Gobbetti et al, "Technical Strategies for Massive Model Visualization," ACM Symposium on Solid and Physical Modeling, Jun. 2008, pp. 405-415.

* cited by examiner

PRODUCT VISUALIZATION SYSTEM

BACKGROUND INFORMATION

1. Field

The present disclosure relates generally to manufacturing and, in particular, to a method and apparatus for visualizing products that are manufactured. Still more particularly, the present disclosure provides a method and apparatus for visualizing models of products.

2. Background

In manufacturing products, a design of the product is often generated using computer-aided design (CAD) systems. These products may include, for example, aircraft, buildings, spacecraft, engines, and other types of products.

The models for many of these products may take the form of massive models. A massive model is a three-dimensional model that may include, for example, 650 million or more polygons as compared to 10 million polygons in smaller types of models. The size of these models may have sizes that are gigabytes and even terabytes.

With these sizes, displaying and handling models is often challenging. Challenges are especially present with displaying the models and providing an operator an ability to interact with the models using interactive three-dimensional applications such as computer-aided design software. Many advances have been made in hardware. For example, processors have become faster and better able to handle more information. However, the size of the memory that can be accessed by processors and the speed of access to the memory such as main memory and hard disks have increased more slowly. As a result, this type of access is a bottleneck in providing a desired level of interaction with any selected subset of a massive model.

Therefore, it would be desirable to have a method and apparatus that take into account at least some of the issues discussed above, as well as other possible issues. For example, it would be desirable to have a method and apparatus that overcome the technical problem of providing a desired performance level of interaction with any selected subset of a massive model using currently available computer systems.

SUMMARY

An embodiment of the present disclosure provides a method for displaying a product. The method accesses a three-dimensional model of the product in a computer system. The three-dimensional model includes objects and a spatial relationship of the objects to each other. The method then identifies a group of the objects in the three-dimensional model to be displayed on a display system in the computer system based on a policy applied to a user input selecting a portion of the product and assigns a value to a group of attributes associated with the group of the objects. The value assigned to the group of the attributes indicates that the group of the objects is to be displayed on the display system. Other objects in the objects having the attributes without the value are not displayed. Next, the method outputs the attributes associated with the objects in which the group of the objects is displayed in three dimensions on the display system using the attributes associated with the objects, enabling a desired level of performance in visualizing the three-dimensional model of the product on the display system.

Another embodiment of the present disclosure provides an apparatus comprising a product visualization system in communication with a display system. The product visualization system is configured to access a three-dimensional model of a product in a computer system. The three-dimensional model includes objects and a spatial relationship of the objects to each other. The product visualization system identifies a group of the objects in the three-dimensional model to be displayed on the display system in the computer system based on a policy applied to a user input selecting the portion of the product; and assigns a value to a group of attributes associated with the group of the objects. The value assigned to the group of the attributes indicates that the group of the objects is to be displayed on the display system. Other objects in the objects having the attributes without the value are not displayed. The product visualization system also outputs the attributes associated with the objects in which the group of the objects is displayed in three dimensions on the display system using the attributes associated with the objects, enabling a desired level of performance in visualizing the three-dimensional model of the product on the display system.

Yet another embodiment of the present disclosure provides a product management system comprising a product visualization system in communication with a display system. The product visualization system accesses a three-dimensional model of a product located in a database in a computer system. The three-dimensional model includes objects and a spatial relationship of the objects to each other. The product visualization system identifies a group of the objects in the three-dimensional model to be displayed on the display system in the computer system based on a policy applied to a user input selecting a portion of the product and assigns a value to a group of attributes associated with the group of the objects. The value assigned to the group of the attributes indicates that the group of the objects is to be displayed on the display system. Other objects in the objects having the attributes without the value are not displayed. The product visualization system also outputs the attributes associated with the objects in which the attributes are used to display the group of the objects in three dimensions on the display system using the attributes in which the group of the objects is displayed without at least one of loading the objects in the three-dimensional model from the database into a main memory or unloading the objects in the three-dimensional model from the main memory in response to the identification of the group of the objects, enabling a desired level of performance in visualizing the three-dimensional model of the product on the display system.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
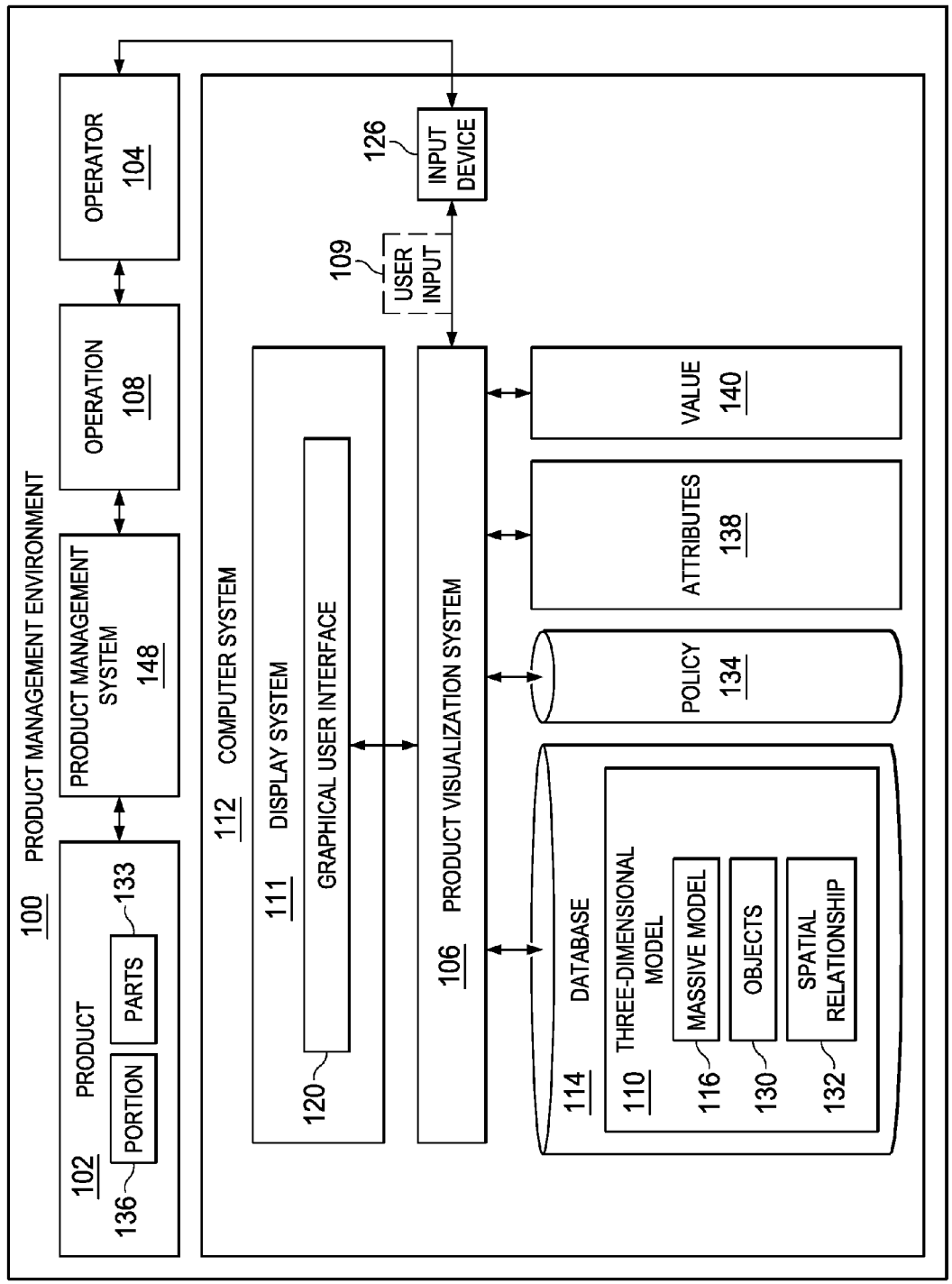
FIG. 1 is an illustration of a block diagram of a product visualization environment in accordance with an illustrative embodiment.

The illustrative embodiments recognize and take into account one or more different considerations. For example, the illustrative embodiments recognize and take into account that a more efficient use of hardware resources may be made in displaying models in an interactive environment. For example, the illustrative embodiments recognize and take into account that currently used computer-aided design applications load objects and unload objects in response to a query. A determination is made as to what objects currently in the memory satisfy the query and what other objects are needed. Objects that are not needed are unloaded from the memory and other objects are loaded into memory, especially when the size of the objects exceeds the size of available memory.

For example, the product may be an aircraft. As an operator visually moves through the aircraft, queries occur to determine what the operator will see in the aircraft. Objects are loaded and unloaded based on the queries to display objects in the aircraft that are seen by the operator.

This process of loading and unloading objects is time-consuming, uses bandwidth, and may lead to less than desired interactive performance for the operator. For example, a desired level of interactive performance may be displaying changes at 10 frames per second. With less than 10 frames per second, the movement through the aircraft or rotation of the aircraft may be slower or less responsive than desired. Delays in movement or jumps in movement may occur.

Thus, the illustrative embodiments provide a method and apparatus for displaying a model. This process may be applied to any model but may be especially suitable for massive models such as those using more physical central processing unit (CPU) memory or graphics processing unit (GPU) memory than is available.

In one illustrative example, a method is present for displaying a product. A three-dimensional model of the product in a computer system is accessed. The model has a description of objects that form the product and the spatial relationship of the objects to each other. A group of the objects in the model to be displayed on a display system in the computer system is identified based on a policy applied to a user input selecting the portion of the product. A value is assigned to an attribute associated with each object in the group of the objects. The attribute indicates whether the object is to be displayed and the value assigned to the attribute indicates that each object in the group of the objects is to be displayed on the display system. Other objects having attributes without the value are not displayed. The attributes associated with the objects are output in which the group of the objects is displayed in three dimensions on the display system using the attributes associated with the objects, enabling a desired level of performance in visualizing the three-dimensional model of the product on the display system.

As used herein, "a group of," when used with reference to items, means one or more items. For example, "a group of objects" is one or more objects.

With reference now to the figures and, in particular, with reference to FIG. 1, an illustration of a block diagram of a product visualization environment is depicted in accordance with an illustrative embodiment. As depicted, product management environment 100 is an example of an environment in which product 102 may be visualized by operator 104 using product visualization system 106.

In the illustrative example, product 102 may take various forms. For example, product 102 may be selected from one of an aircraft, a surface ship, a vehicle, a train, a spacecraft, a building, a manufacturing facility, a power plant, a bridge, an engine, computer network nodes, a wing, or some other suitable product.

In the illustrative example, when operator 104 is a human operator, operator 104 visualizes product 102 to perform operation 108. Operation 108 may be, for example, selected from one of changing the design of product 102, viewing product 102 to form a task for a shop order, reviewing the state of manufacturing product 102, and other suitable types of operations that may be performed using the visualization of product 102.

In the illustrative example, operator 104 also may be a computer, software, or some other suitable entity that may generate user input 109. In this case, operator 104 may generate a visualization of product 102 using three-dimensional model 110 in a presentation to human viewers, such as customers, manufacturing personnel, or other suitable people.

In this illustrative example, product visualization system 106 displays a visualization of product 102. Product visualization system 106 may be implemented in software, hardware, firmware or a combination thereof. When software is used, the operations performed by product visualization system 106 may be implemented in program code configured to run on hardware, such as a processor unit.

When firmware is used, the operations performed by product visualization system 106 may be implemented in program code and data and stored in persistent memory to run on a processor unit. When hardware is employed, the hardware may include circuits that operate to perform the operations in product visualization system 106.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

As depicted, product visualization system 106 may be located in computer system 112. Computer system 112 is a hardware system that includes one or more data processing systems. When more than one data processing system is present, those data processing systems may be in communication with each other using a communications medium. The communications medium may be a network. The data processing systems may be selected from at least one of a computer, a server computer, a workstation, a tablet computer, a laptop computer, a mobile phone, or some other suitable data processing system.

As used herein, the phrase "at least one of,", when used with a list of items, means different combinations of one or more of the listed items may be used and only one of each item in the list may be needed. In other words, "at least one of" means any combination of items and number of items may be used from the list but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

As depicted, three-dimensional model 110 of product 102 is stored in database 114 in computer system 112. For example, database 114 may be located in a location selected from one of a computer in which product visualization system 106 is located or a remote computer in computer system 112.

As depicted, database 114 is an organized collection of data. In this illustrative example, the data includes three-dimensional model 110. Database 114 also may include other models or other types of data.

In this illustrative example, three-dimensional model 110 may be, for example, massive model 116. In the illustrative example, massive model 116 is a model that is large and complex enough that full level detail of the model is often beyond real time visualization. Additionally, the size of massive model 116 often exceeds computer memory limits in currently used computers. For example, when massive model 116 is for an aircraft in the form of a commercial airplane, massive model 116 may have 700 million polygons. This number of polygons may use 20 gigabytes on a hard disk drive or other storage system.

Operator 104 visualizes product 102 by viewing three-dimensional model 110 in computer system 112 using product visualization system 106. For example, product visualization system 106 displays three-dimensional model 110 in graphical user interface 120 displayed on display system 111.

Display system 111 is a hardware system and includes one or more display devices on which graphical user interface 120 may be displayed. As depicted, three-dimensional model 110 is displayed in graphical user interface 120 on display system 111. The display devices may include at least one of a light-emitting diode display (LED), a liquid crystal display (LCD), an organic light-emitting diode display (OLED), or some other suitable device on which graphical user interface 120 can be displayed. Operator 104 may interact with graphical user interface 120 through user input 109 generated by input device 126 in computer system 112. Input device 126 may be, for example, a mouse, a keyboard, a trackball, a touchscreen, a stylus, or some other suitable type of input device.

In an illustrative example, when operator 104 is a computer, software, or some other suitable entity, operator 104 may generate user input 109 in the form of program input generated by the computer or software when operator 104 is a computer or software. The program input may be commands, data, scripts, or other suitable information that may be used to interact with product visualization system 106. For example, input device 126 may be application programming interfaces that send user input 109 to product visualization system 106 when operator 104 is software.

During operation of product visualization system 106, product visualization system 106 accesses three-dimensional model 110 of product 102 in computer system 112. In this illustrative example, three-dimensional model 110 includes objects 130 and spatial relationship 132 of objects 130 to each other. In other words, an object in objects 130 may include a description of the object that is used to display the object and may include information about relationships to other objects in objects 130. Objects 130 may be, for example, polygons that form the three-dimensional shape of objects 130 for display.

In the illustrative example, objects 130 in three-dimensional model 110 represent parts 133 in product 102. When product 102 is an aircraft, parts 133 are digital versions of the physical realizations of objects 130. A part may be, for example, a bolt, a panel, a wing, a housing, a flap, a gear system, a pipe, a valve, a motor, an assembly, a subassembly, or some other suitable type of part.

As depicted, spatial relationship 132 between objects 130 may describe, for example, at least one of a position, an orientation, or a scale about how an object is positioned relative to another object in objects 130. In the illustrative example, the position may be described in a transformation matrix in a coordinate system for product 102 within three-dimensional model 110.

As depicted, product visualization system 106 identifies a group of objects 130 in three-dimensional model 110 to be displayed on display system 111 in computer system 112. As depicted, the group of objects 130 is identified based on policy 134 applied to user input 109 selecting portion 136 of product 102.

In this illustrative example, objects 130 in three-dimensional model 110 are associated with attributes 138. As depicted, attributes 138 are used to indicate whether objects 130 are to be displayed in graphical user interface 120 on display system 111. As depicted, attributes 138 indicate a display state of objects 130. Product visualization system 106 assigns value 140 to a group of attributes 138 for each object in the group of objects 130. Value 140 assigned to the group of attributes 138 indicates that the group of objects 130 is to be displayed in graphical user interface 120 on display system 111 and wherein other objects in objects 130 having the attributes 138 without value 140 are not displayed.

Product visualization system 106 outputs attributes 138 for objects 130 in which the group of objects 130 is displayed in three dimensions on display system 111 using attributes 138 for objects 130, enabling a desired level of performance in visualizing three-dimensional model 110 of product 102 in graphical user interface 120 on display system 111.

With the visualization of product 102, operator 104 may perform operation 108. For example, operator 104 may change the design of product 102, order parts, set up workshop orders, analyze performance of product 102, and other suitable types of operations.

In one illustrative example, operation 108 may be performed to control product management system 148. For example, changes to the design of product 102 as reflected in three-dimensional model 110 may be sent to product management system 148 for implementation. As another example, operator 104 may assign or create a workshop order for product management system 148 in performing operation 108.

Figure 2:
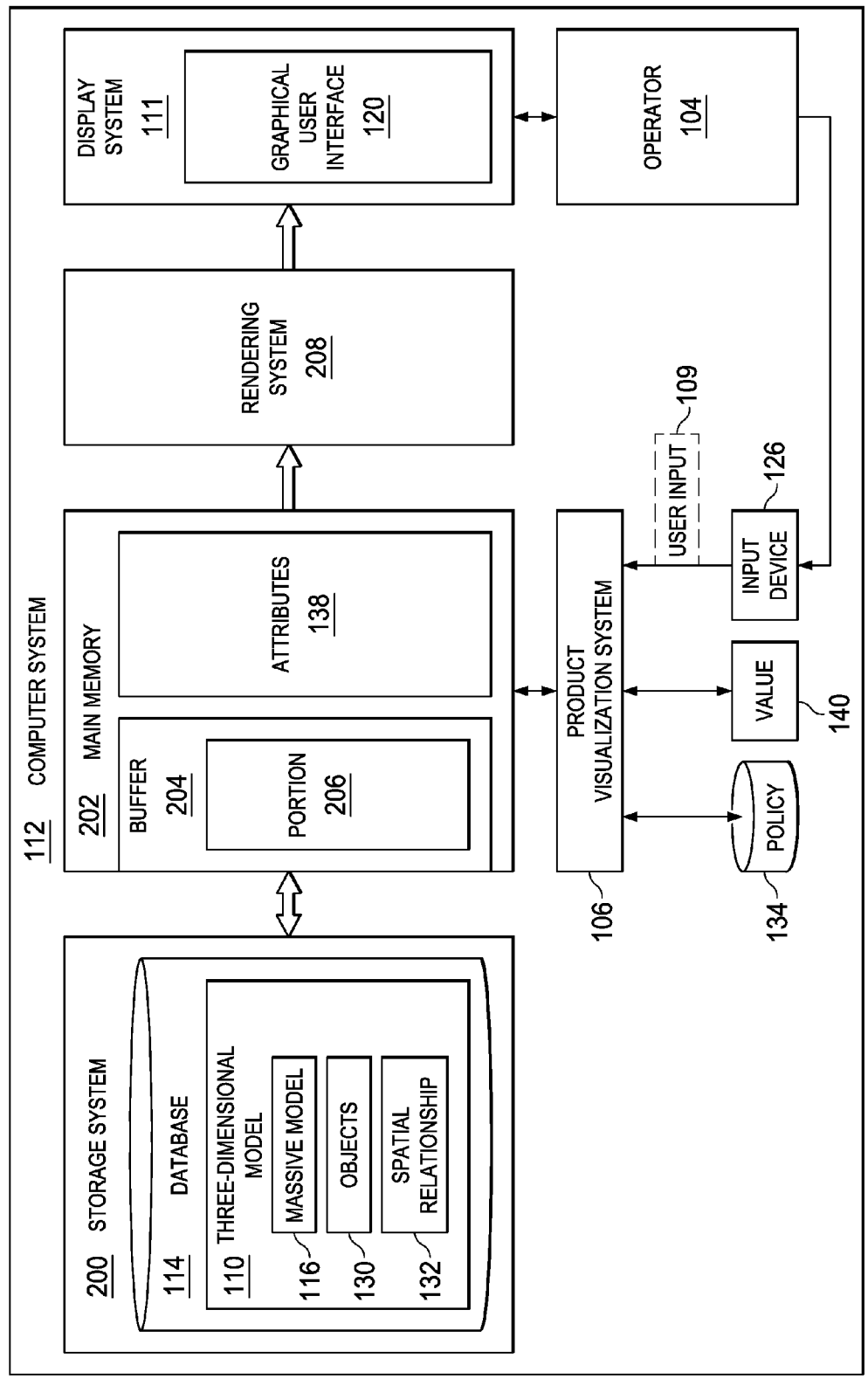
FIG. 2 is an illustration of a block diagram of data flow in displaying a three-dimensional model in accordance with an illustrative embodiment.

With reference next to FIG. 2, an illustration of a block diagram of data flow in displaying a three-dimensional model is depicted in accordance with an illustrative embodiment. In the illustrative examples, the same reference numeral may be used in more than one figure. This reuse of a reference numeral in different figures represents the same element in the different figures. In this figure, an example of data flow that occurs in displaying product 102 in graphical user interface 120 on display system 111 in computer system 112 is shown.

In this illustrative example, database 114 containing three-dimensional model 110 is shown in storage system 200 and computer system 112. Storage system 200 is one or more storage devices and is separate from main memory 202. When more than one storage device is present in storage system 200, those storage devices may be in the same or different data processing systems as computer system 112. As depicted, storage system 200 may be selected from at least one of a hard disk drive, a solid state drive, a random access memory, or some other suitable type of storage device.

As depicted, objects in three-dimensional model 110 are loaded into main memory 202 for display in graphical user interface 120 on display system 111. As depicted, main memory 202 is the memory that provides the fastest access time for displaying three-dimensional model 110 in graphical user interface 120 on display system 111.

In an illustrative example, buffer 204 is set up using part of main memory 202. Buffer 204 is a region of main memory 202 that is used to temporarily store data. In this example, buffer 204 stores portion 206 of objects 130 in three-dimensional model 110. Portion 206 of objects 130 may be objects in objects 130 placed in buffer 204 in case objects 130 in portion 206 should be needed for display based on user input 109.

The selection of objects 130 in portion 206 may be performed in a number of different ways. For example, product visualization system 106 may include a predictive process that predicts what portion of product 102 may be viewed next by operator 104. Objects within objects 130 that are in the portion predicted for viewing are retrieved from database 114 in storage system 200 and placed into buffer 204 in main memory 202.

In this manner, time needed to access objects in storage system 200 may be avoided by having those objects already stored in buffer 204. All of objects 130 in three-dimensional model 110 for product 102 may be displayed depending on the particular configuration of computer system 112.

Of course, other techniques for buffering portion 206 of objects 130 may be used in addition to or in place of a predictive process. For example, the processes may include identifying what polygons are most visible, edge collapsing, and other suitable techniques.

In an illustrative example, all of product 102 may be initially displayed. The display of product 102 does not mean all of three-dimensional model 110 is loaded into main memory 202. The display of the entirety of product 102 may occur as an initial view or default view of product 102 that is generated by product visualization system 106.

Different techniques for reducing the rendering workset may be employed. For example, only polygons that are determined to be visible may be rendered, geometric approximations may be used, and other techniques may be used to reduce the amount of processing resources needed to display product 102. In these illustrative examples, rendering is a process of generating an image from a model for display on display system 111.

As depicted, operator 104 interacts with three-dimensional model 110 of product 102 as displayed in graphical user interface 120 on display system 111. This interaction may take the form of user input 109 received from operator 104 through input device 126.

In this illustrative example, user input 109 selects portion 136 of product 102 for display. In particular, portion 136 is a group of objects 130.

As depicted, user input 109 may select portion 136 of product 102 in a number of different ways. For example, user input 109 may be selected from at least one of a string identifying the portion of the product, a visual selection of the portion of the product, a selection of a group of shop orders indicating a status of an installation of a group of parts in the product, a selection of a position of the product from positions in which the product is assembled, a clipping box, or in some other suitable manner.

Product visualization system 106 applies policy 134 to user input 109 for selecting the group of objects 130. For example, policy 134 may identify objects 130 that are visible in three-dimensional model 110 based on at least one of a position of product 102 in an assembly process, a condition of assembly, a status of workshop orders identifying a status of parts 133 represented by objects in portion 136, a condition of assembly of parts 133 in the portion, or some other suitable rule.

Based on identifying the group of objects 130 using user input 109 and policy 134, product visualization system 106 assigns value 140 to a group of attributes 138. The group of attributes 138 is one or more attributes in attributes 138 that are for the group of objects 130 that have been identified. Value 140 may take various forms.

For example, value 140 may be a logical value, a number, a string, or some other suitable manner in indicating whether an object should or should not be visible. Objects 130 that are not visible are objects 130 that are not displayed in graphical user interface 120 on display system 111.

In this illustrative example, product visualization system 106 may display the group of objects 130 in a number of different ways. In this illustrative example, product visualization system 106 displays the group of objects 130 by sending attributes 138 to rendering system 208. In other words, product visualization system outputs attributes 138 that are sent to rendering system 208.

Rendering system 208 selectively displays objects 130 in graphical user interface 120 on display system 111 using attributes 138. In the illustrative example, rendering system 208 may be implemented using various types of graphics interfaces. For example, rendering system 208 may be implemented using Open Graphics Library (OpenGL), Microsoft DirectX, or some other suitable interface.

In the illustrative example, the displaying of the group of objects 130 occurs without at least one of loading objects 130 in three-dimensional model 110 from database 114 into main memory 202 or unloading objects 130 in three-dimensional model 110 from main memory 202 in response to the identification of the group of objects 130. For example, loading the group of objects 130 into main memory 202 from database 114 in storage system 200 and unloading objects 130 in three-dimensional model 110 from main memory 202 is not needed to display the group of objects.

In other words, loading or unloading of the group of objects 130 or other objects in objects 130 from main memory 202 does not occur in response to identifying the group of objects 130 for display. Loading or unloading of the group of objects 130 is not needed when using product visualization system 106 to change the display of the group of objects 130 in three-dimensional model 110. As a result, performance degradation, such as bottlenecks, and slower access time for remote storage to access data used to display the group of objects 130 from database 114 or some other remote location is avoided.

Thus, the illustrative example provides a method and apparatus that provides one or more technical solutions that overcome the technical problem of providing a desired level of interaction with a model using currently available computer systems. For example, one or more of the technical solutions may provide desired performance level of interaction with any selected subset of a massive model as compared to using currently available computer systems.

For example, the desired level of interaction may occur through displaying changes to three-dimensional model 110 as quickly as desired in response to user input 109. For example, displaying changes in five seconds or less may provide a desired level of interaction. Product visualization system. 106 enables displaying three-dimensional model 110 with a desired level of performance especially when three-dimensional model 110 takes the form of massive model 116.

As a result, computer system 112 operates as a special purpose computer system in which product visualization system 106 in computer system 112 enables visualizing three-dimensional model 110 for product 102 with a desired level of performance. In particular, product visualization system 106 transforms computer system 112 into a special purpose computer system as compared to currently available general computer systems that do not have product visualization system 106. Product visualization system 106 allows for displaying three-dimensional model 110 on graphical user interface 120 in display system 111 with a desired level of performance, such as a desired number of frames per second.

This display of three-dimensional model 110 on graphical user interface 120 in display system 111 may be performed using rendering system 208 in the form of a 3D subsystem. A 3D subsystem is a hardware system including a group of graphical processor units, memory assigned to the group of graphical processor units, and other suitable components. The 3D subsystem may be implemented in a graphics card or in some other suitable manner. In other words, product visualization system 106 allows for a more efficient use of resources in computer system 112 in a manner that allows computer system 112 to more quickly display changes in three-dimensional model 110 in response to user input 109 from operator 104 for manipulating the display of three-dimensional model 110.

The illustration of product management environment 100 and the different components in this environment in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, product visualization system 106 may display the group of objects 130 by rendering objects 130 using attributes 138 instead of sending attributes 138 to rendering system 208. In other words, product visualization system 106 may implement processes for rendering objects 130.

In other illustrative examples, objects 130 may not correspond to physical parts. For example, if product 102 is a network, objects 130 may correspond to network nodes in the network.

In another illustrative example, three-dimensional model 110 may include other information in addition to objects 130 and spatial relationship 132. For example, three-dimensional model 110 may also include information describing the object. This information may include, for example, materials for the object that may be used to create the part represented by the object, processes to create the part represented by the object, or other suitable information. This type of information may be referred to as metadata for objects 130.

With reference next to FIGS. 3-7, illustrations of the display of a three-dimensional model of a product in the form of an aircraft in a graphical user interface is depicted in accordance with an illustrative embodiment. The different views of the three-dimensional model are generated using product visualization system 106 in FIG. 1.

Figure 3:
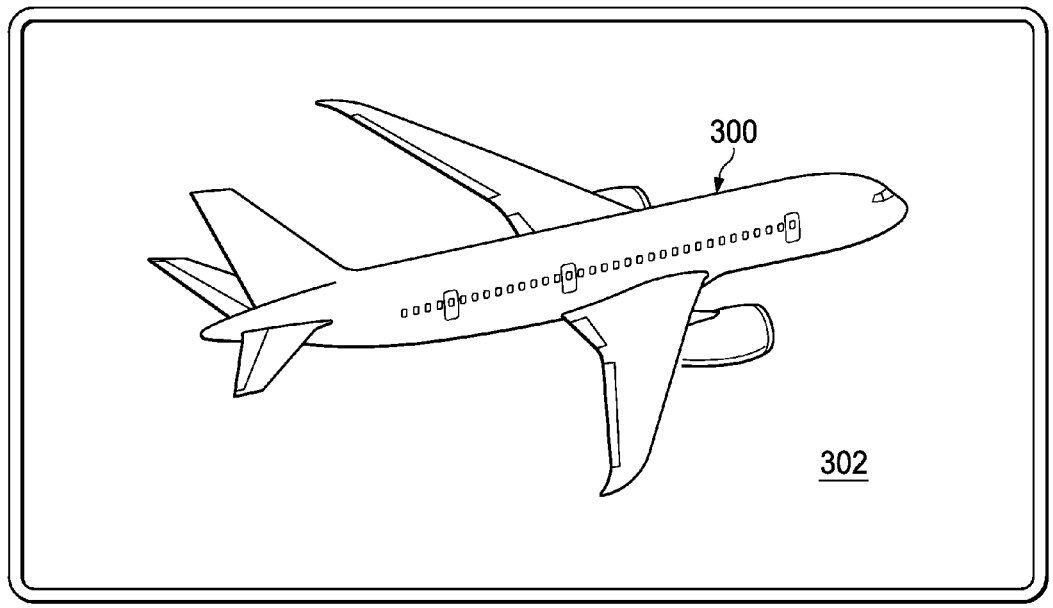
FIG. 3 is an illustration of a three-dimensional model of an aircraft displayed in a graphical user interface in accordance with an illustrative embodiment.

With reference first to FIG. 3, an illustration of a three-dimensional model of an aircraft displayed in a graphical user interface is depicted in accordance with an illustrative embodiment. As depicted, aircraft 300 is shown in graphical user interface 302. Graphical user interface 302 is an example of an implementation for graphical user interface 120 shown in block form in FIGS. 1 and 2. Aircraft 300 is a visualization of a three-dimensional model for an actual physical aircraft that may or may not have been manufactured or is in the process of being manufactured.

As depicted, the default view of aircraft 300 is shown in graphical user interface 302. The default view in this particular example is to show all of aircraft 300.

Figure 4:
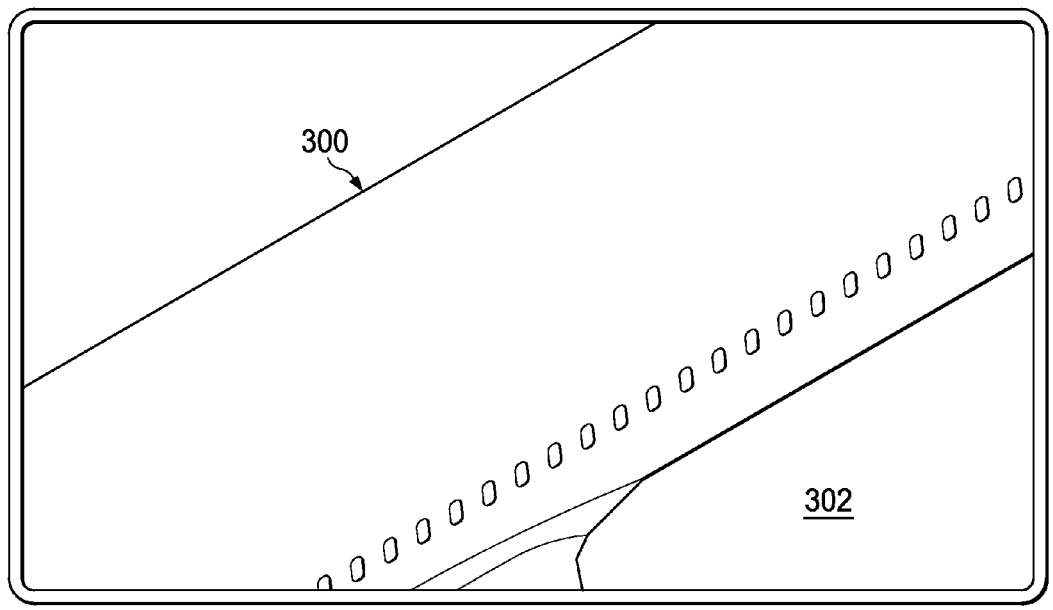
FIG. 4 is an illustration of a closer view of an aircraft displayed in a graphical user interface in accordance with an illustrative embodiment.

Turning next to FIG. 4, an illustration of a closer view of an aircraft displayed in a graphical user interface is depicted in accordance with an illustrative embodiment. In this view, user input has zoomed to a closer view of aircraft 300 displayed in graphical user interface 302.

Figure 5:
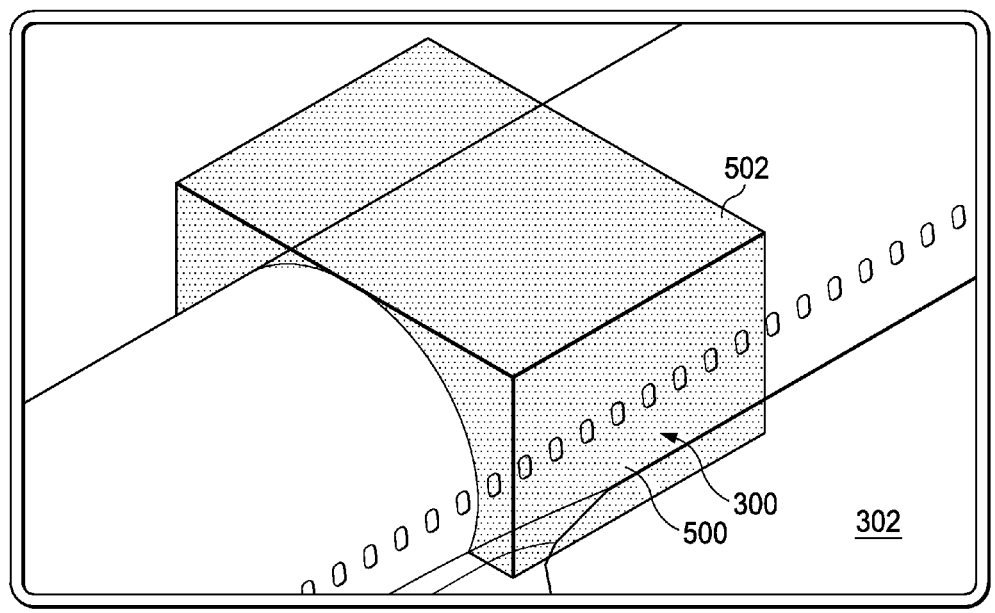
FIG. 5 is an illustration of a three-dimensional model of a selection of a portion of an aircraft displayed in a graphical user interface in accordance with an illustrative embodiment.

With reference to FIG. 5, an illustration of a three-dimensional model of a selection of a portion of an aircraft displayed in a graphical user interface is depicted in accordance with an illustrative embodiment. As depicted, user input has selected portion 500 of aircraft 300. In this illustrative example, portion 500 is selected using clipping box 502.

Figure 6:
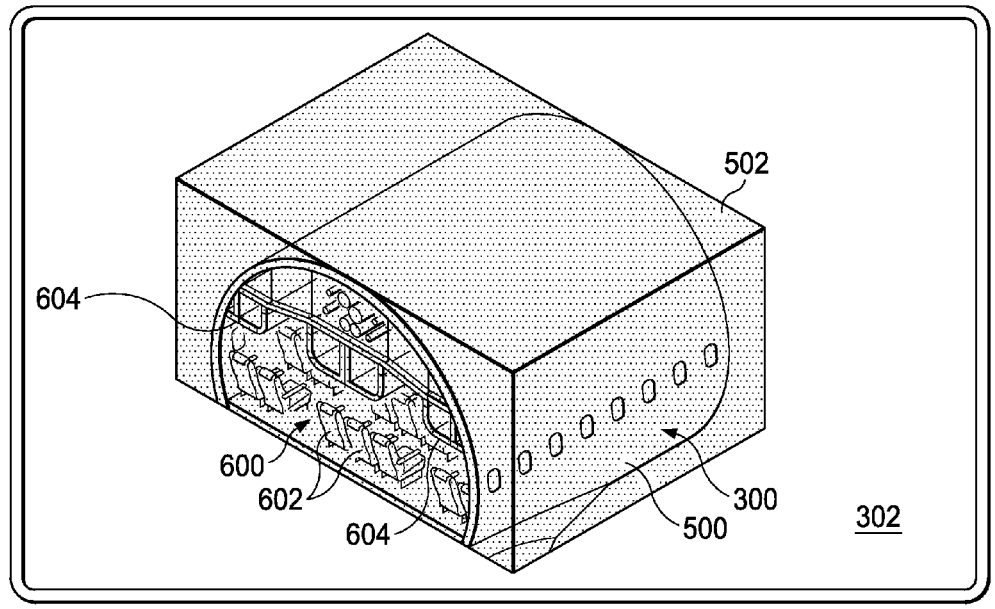
FIG. 6 is an illustration of a portion of an aircraft displayed in a graphical user interface in accordance with an illustrative embodiment.

Turning next to FIG. 6, an illustration of a portion of an aircraft displayed in a graphical user interface is depicted in accordance with an illustrative embodiment. In this example, interior 600 of aircraft 300 can be seen. As depicted, seats 602 and overhead bins 604 are seen within interior 600 of aircraft 300.

This interior view is a view that would be displayed without using product visualization system 106. In this illustrative example, product visualization system 106 identifies the group of objects representing portion 500 of aircraft 300 and applies a policy to this group of objects.

For example, the policy may include a rule that only displays objects in portion 500 that are present for a condition of assembly at a particular stage in manufacturing aircraft 300. For example, in the particular stage or condition of assembly, seats 602 and overhead bins 604 are not yet installed in aircraft 300.

This condition of assembly of aircraft 300 may be visualized. Product visualization system 106 sets a value for attributes associated with the group of objects that should be visualized in portion 500. For example, all of the objects except for seats 602 and overhead bins 604 may be set to a logic "1". Seats 602 and overhead bins 604 may be set to a logic "0". These attributes are used to determine which object should be displayed.

The view of aircraft 300 in FIG. 6 is not actually displayed to an operator in this example. Of course, in other illustrative examples, this view of interior 600 of aircraft 300 may be displayed prior to product visualization system 106 applying the policy to the group of objects in portion 500.

Figure 7:
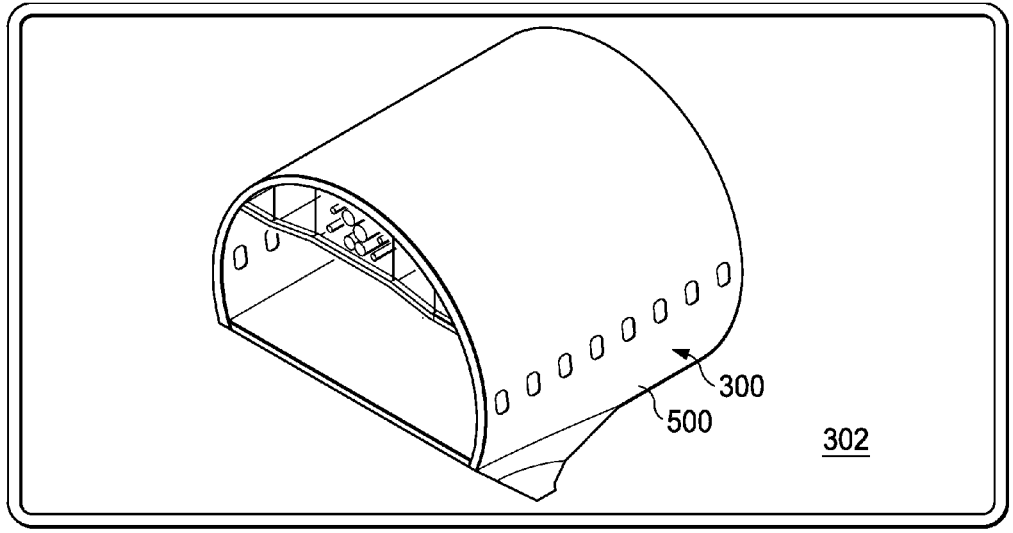
FIG. 7 is an illustration of a portion of an aircraft displayed in a graphical user interface in accordance with an illustrative embodiment.

Turning next to FIG. 7, an illustration of a portion of an aircraft displayed in a graphical user interface is depicted in accordance with an illustrative embodiment. This view of aircraft 300 is displayed based on the user input selecting portion 500 of aircraft 300. This display of the group of objects in portion 500 of aircraft 300 is made without having to load or unload the objects in portion 500.

In this manner, the performance of viewing portions of an aircraft based on user input may occur with a desired level of performance. For example, the display of portion 500 may occur smoothly and quickly enough to provide rapid viewing by an operator.

The illustrations of the display of a model of an aircraft in a graphical user interface as rendered using a 3D subsystem and the selection of a portion of the aircraft for visualization in FIGS. 3-7 are only provided as examples of one manner in which the graphical user interface for a product visualization system may be implemented. For example, the selection of the portion of the aircraft used identify the group of objects that are to be displayed may be made using other types of user input in addition to or in place of the clipping box. For example, the user input may be text that is entered identifying portion 500 of aircraft 300. In another illustrative example, portion 500 may be predefined as a selection of that portion by moving a pointer to portion 500 and double-clicking portion 500.

Additionally, the three-dimensional model is for a product in the form of an aircraft. In other illustrative examples, the three-dimensional model may be for products and other forms such as, for example, a surface ship, an engine, a power plant, or some other suitable type of product.

As another example, attributes may be given different values other than a logic "0" and a logic "1". For example, an attribute may contain the string "visible" for the group of objects that should be displayed. The attribute may contain the string "hidden" for the group of objects that should not be displayed.

In yet another illustrative example, the policy may be a rule other than a condition of assembly for the aircraft. For example, the rule may be that objects are visible when the objects representing parts that have shop orders in portion 500 that have been completed at the time the selection of portion 500 is made. In another example, they may be objects representing parts that have been completed on a particular date.

Figure 8:
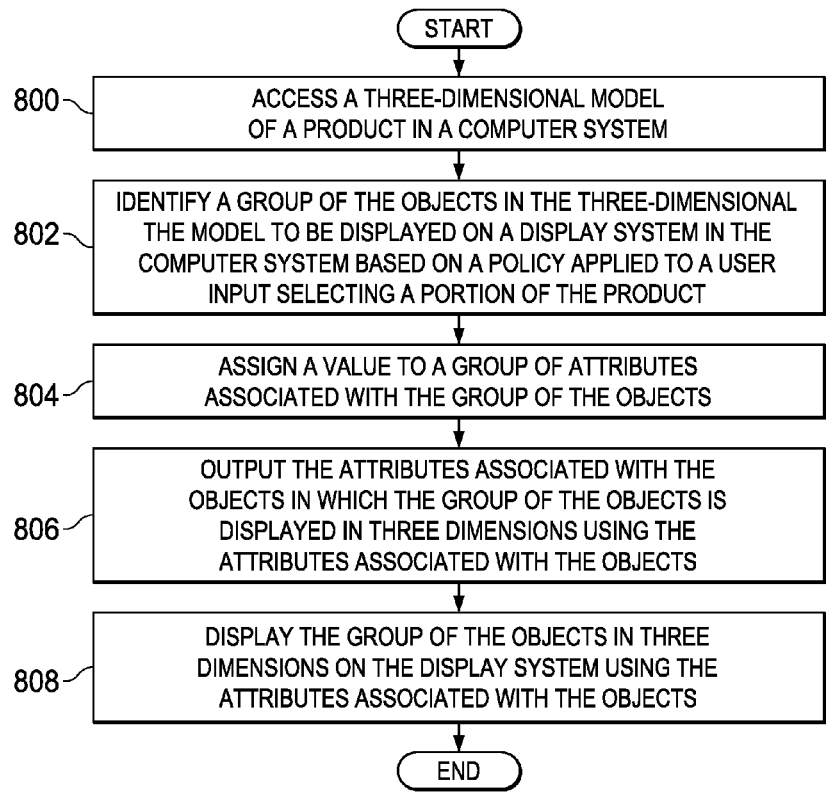
FIG. 8 is an illustration of a flowchart of a process for displaying a product in accordance with an illustrative embodiment.

With reference now to FIG. 8, an illustration of a flowchart of a process for displaying a product is depicted in accordance with an illustrative embodiment. The process illustrated in FIG. 8 may be implemented in product management environment 100. For example, the process may be implemented by product visualization system 106 to display three-dimensional model 110 for product 102.

The process begins by accessing a three-dimensional model of the product in a computer system (operation 800). The three-dimensional model includes objects and a spatial relationship of the objects to each other.

The process identifies a group of the objects in the three-dimensional model to be displayed on a display system in the computer system based on a policy applied to a user input selecting the portion of the product (operation 802). The process assigns a value to a group of attributes associated with the group of the objects (operation 804). The value assigned to the group of the attributes indicates that the group of the objects is to be displayed on the display system and wherein other objects in the objects having the attributes without the value are not displayed.

The process outputs the attributes associated with the objects in which the group of the objects is displayed in three dimensions using the attributes associated with the objects (operation 806). The process displays the group of objects in three dimensions on the display system using the attributes associated with the objects (operation 808) with the process terminating thereafter.

The process illustrated in this figure enables a desired level of performance in visualizing the three-dimensional model of the product on the display system. For example, the desired level of performance may be based on frames per second, such as 10 frames per second or better. In this manner, the change in the display of three-dimensional model 110 rendered by a 3D subsystem in graphical user interface 120 in display system 111 may occur as smoothly and quickly as desired for an operator or other viewer of three-dimensional model 110.

Figure 9:
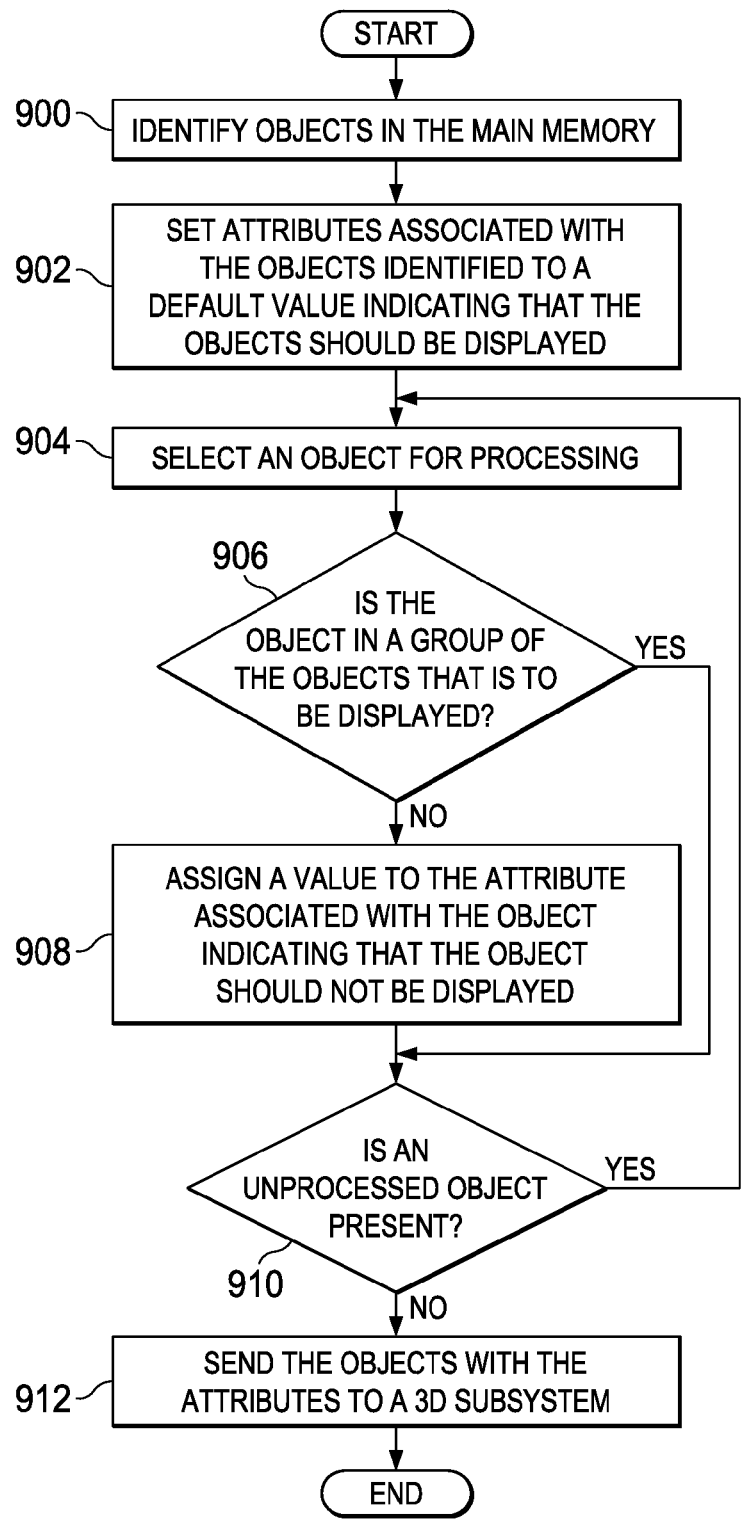
FIG. 9 is an illustration of a flowchart of a process for assigning a value to attributes associated with objects in a three-dimensional model in accordance with an illustrative embodiment.

With reference now to FIG. 9, an illustration of a flowchart of a process for assigning a value to attributes associated with objects in a three-dimensional model is depicted in accordance with an illustrative embodiment. The process illustrated in FIG. 9 is an example of one implementation for operation 804 in FIG. 8.

The process begins by identifying objects in the main memory (operation 900). The process sets attributes associated with the objects identified to a default value indicating that the objects should be displayed (operation 902). The process then selects an object for processing (operation 904).

The process determines whether the object is in a group of the objects that is to be displayed (operation 906). If the object is not in the group of the objects that is to be displayed, the process assigns a value to the attribute associated with the object indicating that the object should not be displayed (operation 908).

A determination is then made as to whether an unprocessed object is present (operation 910). If an unprocessed object is present, the process then returns to operation 904. Otherwise, if an unprocessed object is not present, the process sends the objects with the attributes to a 3D subsystem (operation 912) with the process terminating thereafter.

In operation 912, the objects and attributes are sent to the 3D subsystem for rendering to be displayed in a graphical user interface on a display system. With reference again to operation 906, if the object is in the group of the objects that is to be displayed, the process proceeds to operation 910 as described above.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

For example, in the flowchart in FIG. 9, all of the attributes associated with the objects could be set to the value indicating that the object should be displayed as a default in operation 902. Then, objects may be identified that are not to be displayed and the attributes associated with those objects are set to a second value in operation 908. In another illustrative example, the attributes may be set to a default to not display objects and attributes associated with the objects identified to be displayed are changed in value.

Figure 10:
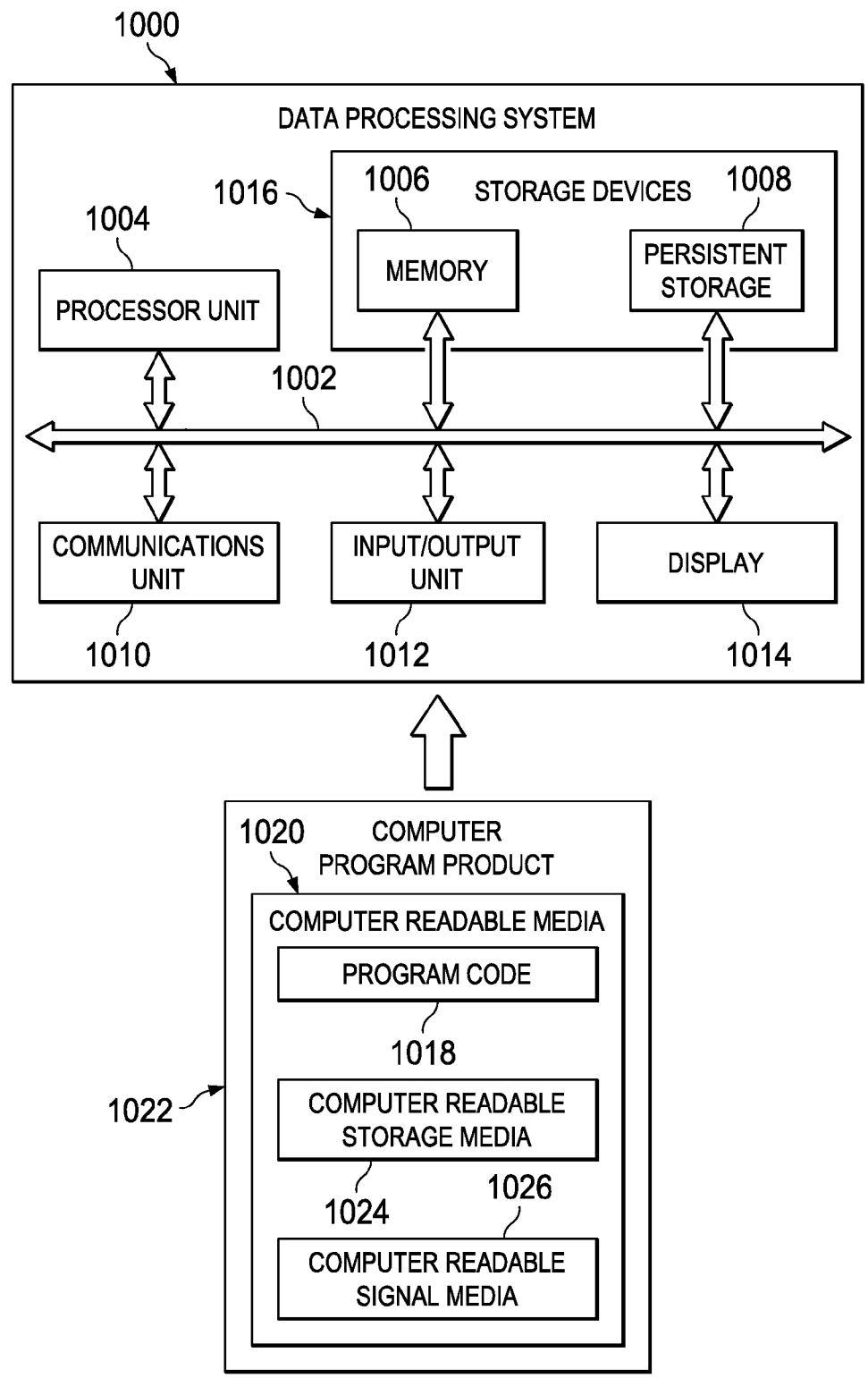
FIG. 10 is an illustration of a block diagram of a data processing system in accordance with an illustrative embodiment.

Turning now to FIG. 10, an illustration of a block diagram of a data processing system is depicted in accordance with an illustrative embodiment. Data processing system 1000 may be used to implement one or more data processing systems in computer system 112. In this illustrative example, data processing system 1000 includes communications framework 1002, which provides communications between processor unit 1004, memory 1006, persistent storage 1008, communications unit 1010, input/output (I/O) unit 1012, and display 1014. In this example, communications framework 1002 may take the form of a bus system.

Processor unit 1004 serves to execute instructions for software that may be loaded into memory 1006. Processor unit 1004 may be a number of processors, a multi-processor core, or some other type of processor, depending on the particular implementation.

Memory 1006 and persistent storage 1008 are examples of storage devices 1016. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1016 may also be referred to as computer readable storage devices in these illustrative examples.

Memory 1006, in these examples, may be, for example, a random access memory or any other suitable volatile or non-volatile storage device. Memory 1006 is an example of main memory 202 in FIG. 2.

Persistent storage 1008 may take various forms, depending on the particular implementation. For example, persistent storage 1008 may contain one or more components or devices. For example, persistent storage 1008 may be a hard drive, a flash memory, a rewritable optical disk, a solid state drive, a rewritable magnetic tape, or some combination of the above. The media used by persistent storage 1008 also may be removable. For example, a removable hard drive may be used for persistent storage 1008.

Communications unit 1010, in these illustrative examples, provides for communications with other data processing systems or devices. In these illustrative examples, communications unit 1010 is a network interface card.

Input/output unit 1012 allows for input and output of data with other devices that may be connected to data processing system 1000. For example, input/output unit 1012 may provide a connection for user input through at least of a keyboard, a mouse, or some other suitable input device. Further, input/output unit 1012 may send output to a printer. Display 1014 provides a mechanism to display information to a user.

Instructions for at least one of the operating system, applications, or programs may be located in storage devices 1016, which are in communication with processor unit 1004 through communications framework 1002. The processes of the different embodiments may be performed by processor unit 1004 using computer-implemented instructions, which may be located in a memory, such as memory 1006.

These instructions are referred to as program code, computer usable program code, or computer readable program code that may be read and executed by a processor in processor unit 1004. The program code in the different embodiments may be embodied on different physical or computer readable storage media, such as memory 1006 or persistent storage 1008.

Program code 1018 is located in a functional form on computer readable media 1020 that is selectively removable and may be loaded onto or transferred to data processing system 1000 for execution by processor unit 1004. Program code 1018 and computer readable media 1020 form computer program product 1022 in these illustrative examples. In one example, computer readable media 1020 may be computer readable storage media 1024 or computer readable signal media 1026. In these illustrative examples, computer readable storage media 1024 is a physical or tangible storage device used to store program code 1018 rather than a medium that propagates or transmits program code 1018.

Alternatively, program code 1018 may be transferred to data processing system 1000 using computer readable signal media 1026. Computer readable signal media 1026 may be, for example, a propagated data signal containing program code 1018. For example, computer readable signal media 1026 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1000 are not meant to provide architectural limitations to the manner in which different embodiments may be implemented. The different illustrative embodiments may be implemented in a data processing system including components in addition to or in place of those illustrated for data processing system 1000. Other components shown in FIG. 10 can be varied from the illustrative examples shown. The different embodiments may be implemented using any hardware device or system capable of running program code 1018.

Figure 11:
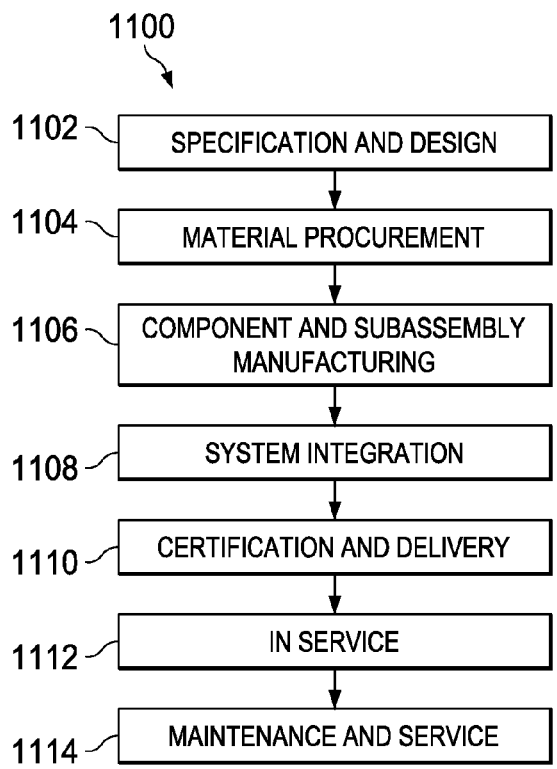
FIG. 11 is an illustration of a block diagram of an aircraft manufacturing and service method in accordance with an illustrative embodiment.
Figure 12:
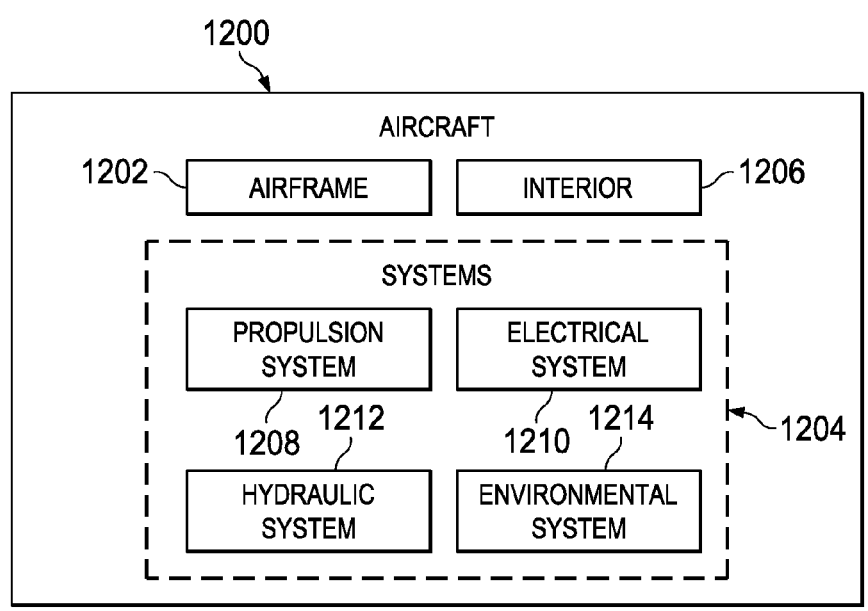
FIG. 12 is an illustration of a block diagram of an aircraft in accordance with an illustrative embodiment.

Illustrative embodiments of the disclosure may be described in the context of aircraft manufacturing and service method 1100 as shown in FIG. 11 and aircraft 1200 as shown in FIG. 12. Turning first to FIG. 11, an illustration of a block diagram of an aircraft manufacturing and service method is depicted in accordance with an illustrative embodiment. During pre-production, aircraft manufacturing and service method 1100 may include specification and design 1102 of aircraft 1200 in FIG. 12 and material procurement 1104.

During production, component and subassembly manufacturing 1106 and system integration 1108 of aircraft 1200 in FIG. 12 takes place. Thereafter, aircraft 1200 in FIG. 12 may go through certification and delivery 1110 in order to be placed in service 1112. While in service 1112 by a customer, aircraft 1200 in FIG. 12 is scheduled for routine maintenance and service 1114, which may include modification, reconfiguration, refurbishment, and other maintenance or service.

Each of the processes of aircraft manufacturing and service method 1100 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 12, an illustration of a block diagram of an aircraft is depicted in which an illustrative embodiment may be implemented. In this example, aircraft 1200 is produced by aircraft manufacturing and service method 1100 in FIG. 11 and may include airframe 1202 with plurality of systems 1204 and interior 1206. Examples of systems 1204 include one or more of propulsion system 1208, electrical system 1210, hydraulic system 1212, and environmental system 1214. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1100 in FIG. 11. In one illustrative example, a three-dimensional model of aircraft 1200 may be visualized and modified during specification and design 1102 using product visualization system 106. Additionally, visualization of aircraft 1200 may also occur during component and subassembly manufacturing 1106 and system integration 1108. The visualization may aid operators performing these operations as well is being used to assign tasks in performing these operations. One or more apparatus embodiments, method embodiments, or a combination thereof may be utilized while aircraft 1200 is in service 1112, during maintenance and service 1114 in FIG. 11, or both. The use of a number of the different illustrative embodiments may substantially expedite the assembly of aircraft 1200, reduce the cost of aircraft 1200, or both expedite the assembly of aircraft 1200 and reduce the cost of aircraft 1200.

Figure 13:
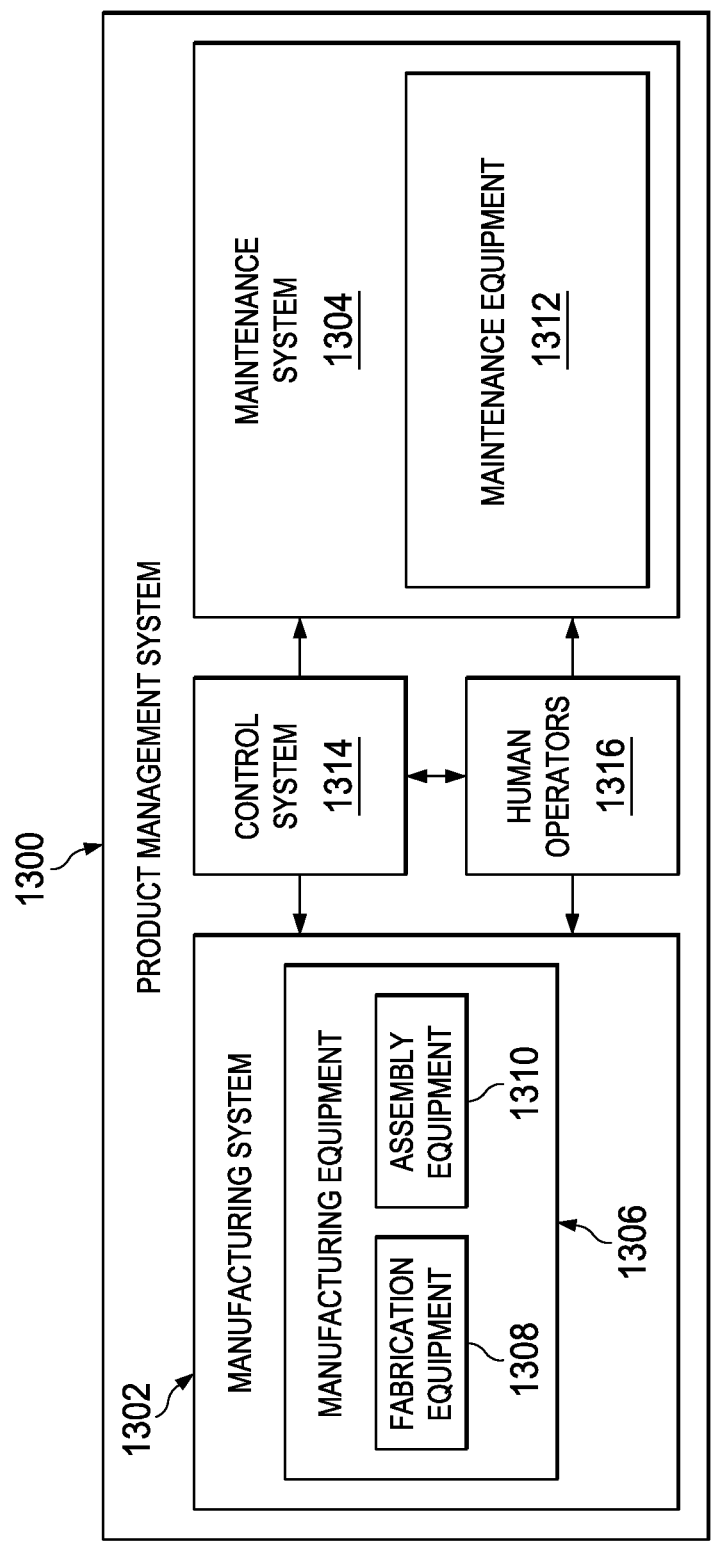
FIG. 13 is an illustration of a block diagram of a product management system in accordance with an illustrative embodiment.

Turning now to FIG. 13, an illustration of a block diagram of a product management system is depicted in accordance with an illustrative embodiment. One illustrative example of an implementation for product management system 148 in FIG. 1 is shown in this figure. Product management system 1300 is a physical hardware system and may include at least one of manufacturing system 1302 or maintenance system 1304.

Manufacturing system 1302 is configured to manufacture products, such as aircraft 1200 in FIG. 12. As depicted, manufacturing system 1302 includes manufacturing equipment 1306. Manufacturing equipment 1306 includes at least one of fabrication equipment 1308 or assembly equipment 1310.

Fabrication equipment 1308 is equipment that may be used to fabricate components for parts used to form aircraft 1200. For example, fabrication equipment 1308 may include machines and tools. These machines and tools may be at least one of a drill, a hydraulic press, a furnace, a mold, a composite tape laying machine, a vacuum system, a lathe, or other suitable types of equipment. Fabrication equipment 1308 may be used to fabricate at least one of metal parts, composite parts, semiconductors, circuits, fasteners, ribs, skin panels, spars, antennas, or other suitable types of parts.

Assembly equipment 1310 is equipment used to assemble parts to form aircraft 1200. In particular, assembly equipment 1310 may be used to assemble components and parts to form aircraft 1200. Assembly equipment 1310 also may include machines and tools. These machines and tools may be at least one of a robotic arm, a crawler, a faster installation system, a rail-based drilling system, a robot, or other suitable types of equipment. Assembly equipment 1310 may be used to assemble parts such as seats, horizontal stabilizers, wings, engines, engine housings, landing gear systems, and other parts for aircraft 1200.

In this illustrative example, maintenance system 1304 includes maintenance equipment 1312. Maintenance equipment 1312 may include any equipment needed to perform maintenance on aircraft 1200. Maintenance equipment 1312 may include tools for performing different operations on parts on aircraft 1200. These operations may include at least one of disassembling parts, refurbishing parts, inspecting parts, reworking parts, manufacturing placement parts, or other operations for performing maintenance on aircraft 1200. These operations may be for routine maintenance, inspections, upgrades, refurbishment, or other types of maintenance operations.

In the illustrative example, maintenance equipment 1312 may include ultrasonic inspection devices, x-ray imaging systems, vision systems, drills, crawlers, and other suitable device. In some cases, maintenance equipment 1312 may include fabrication equipment 1308, assembly equipment 1310, or both to produce and assemble parts that may be needed for maintenance.

Product management system 1300 also includes control system 1314. Control system 1314 is a hardware system and may also include software or other types of components. Control system 1314 is configured to control the operation of at least one of manufacturing system 1302 or maintenance system 1304. In particular, control system 1314 may control the operation of at least one of fabrication equipment 1308, assembly equipment 1310, or maintenance equipment 1312.

The hardware in control system 1314 may include computers, circuits, networks, and other types of equipment. The control may take the form of direct control of manufacturing equipment 1306. For example, robots, computer-controlled machines, and other equipment may be controlled by control system 1314. In other illustrative examples, control system 1314 may manage operations performed by human operators 1316 in manufacturing or performing maintenance on aircraft 1200. For example, control system 1314 may assign tasks, provide instructions, display models, or perform other operations to manage operations performed by human operators 1316.

In these illustrative examples, product visualization system 106 in FIGS. 1 and 2 may be implemented in control system 1314 to manage at least one of the manufacturing or maintenance of aircraft 1200 in FIG. 12. For example, the visualization of a three-dimensional model of aircraft 1200 may be made by a human operator. This visualization may be used by the human operator to make changes to the model of aircraft 1200 for specifications for aircraft 1200. These changes may be implemented by control system 1314 in controlling operations performed by at least one of manufacturing equipment 1306, maintenance equipment 1312, or human operators 1316.

In the different illustrative examples, human operators 1316 may operate or interact with at least one of manufacturing equipment 1306, maintenance equipment 1312, or control system 1314. This interaction may be performed to manufacture aircraft 1200.

Of course, product management system 1300 may be configured to manage other products other than aircraft 1200. Although product management system 1300 has been described with respect to manufacturing in the aerospace industry, product management system 1300 may be configured to manage products for other industries. For example, product management system 1300 may be configured to manufacture products for the automotive industry as well as any other suitable industries.

Thus, the illustrative example provides a method and apparatus that provides one or more technical solutions that overcome the technical problem of providing a desired level of interaction with a model using currently available computer systems. For example, the desired level of interaction may occur through displaying changes to a three-dimensional model as quickly as desired in response to a user input that manipulates the display of the product in a graphical user interface on a display system. As depicted in the illustrative example, the product visualization system enables displaying a three-dimensional model with a desired level of performance especially when the three-dimensional model takes the form of massive model 116. For example, the product visualization system enables displaying a three-dimensional model with a desired number of frames per second as compared to currently used computer systems and configurations. Displaying the three-dimensional model with a desired number of frames per second, such as 10 frames per second, may occur with a lower use of resources as compared to using other currently available computer systems.

The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for displaying a product, the method comprising:
    accessing a three-dimensional model of the product in a computer system, wherein the three-dimensional model includes objects and a spatial relationship of the objects to each other, and comprises at least 650 million polygons;
    identifying a group of the objects in the three dimensional model to be displayed on a display system in the computer system based on a policy applied to a user input selecting a portion of the product, such that the policy comprises an object identification based upon at least one of a group comprising: a condition of an assembly, a status of workshop orders identifying a status of parts represented by the group of objects in the portion of the produce, and a condition of assembly of parts in the portion;
    assigning a value to a group of attributes associated with the group of the objects, wherein the value assigned to the group of the attributes indicates that the group of the objects is to be displayed on the display system, and wherein the other objects in the objects having the attributes without the value are not displayed;
    outputting the attributes associated with the objects in which the group of the objects is displayed in three dimensions on a display system using the attributes associated with the objects; and
    displaying the three-dimensional model of the product on the display system at least at 10 frames per second.

2. The method of claim 1 further comprising:
    displaying the group of the objects in the three dimensions on the display system using the attributes associated with the objects.

3. The method of claim 2 wherein the three-dimensional model is stored in a database, and wherein the displaying of the group of the objects occurs without at least one of loading the objects in the three-dimensional model from the database into a main memory or unloading the objects in the three-dimensional model from the main memory in response to an identification of the group of the objects.

4. The method of claim 1, wherein the outputting step comprises:
    sending the attributes needed to display the objects to a rendering system, wherein the rendering system displays the objects on the display system using the attributes that indicate a display state of the objects.

5. The method of claim 1 further comprising: displaying all of the objects in the three dimensional model of the product.

6. The method of claim 1 further comprising:
receiving the user input that is selected from at least one of a string identifying the portion of the product, a visual selection of the portion of the product, a selection of a group of shop orders indicating a status of an installation of a group of parts in the product, a selection of a position of the product from positions in which the product is assembled, or defining a clipping box.

7. The method of claim 1, wherein the policy identifies the objects that are visible in the three-dimensional model based on a position of the product in an assembly process.

8. The method of claim 1 further comprising: placing a portion of the objects in a buffer.

9. The method of claim 1, wherein the three-dimensional model is a massive model stored in a database in the computer system.

10. The method of claim 1, wherein the product is selected from one of an aircraft, a surface ship, a vehicle, a train, a spacecraft, a building, a manufacturing facility, a power plant, a bridge, an engine, and a wing.

11. An apparatus comprising:
a product visualization system in communication with a display system;
the product visualization system configured to:
access a three-dimensional model of a product in a computer system, wherein the three dimensional model includes objects and a spatial relationship of the objects to each other, and comprises at least 650 million polygons;
identify a group of the objects in the three-dimensional model to be displayed on the display system in the computer system based on a policy applied to a user input selecting a portion of the product, such that the policy comprises an object identification based upon at least one of a group comprising: a condition of an assembly, a status of workshop orders identifying a status of parts represented by the group of objects in the portion of the produce, and a condition of assembly of parts in the portion;
assign a value to a group of attributes associated with the group of the objects, wherein the value assigned to the group of the attributes indicates that the group of the objects is to be displayed on the display system and wherein other objects in the objects having the attributes without the value are not displayed; and
output, based upon the attributes associated with the objects in which the group of the objects is displayed in three dimensions on the display system, the attributes associated with the objects, the three-dimensional model of the product on the display system at least at 10 frame per second.

12. The apparatus of claim 11, further comprising:
a database configured to store the three-dimensional model, and wherein the product visualization system is configured to display the group of the objects without at least one of: loading the objects in the three-dimensional model from the database into a main memory, or unloading the objects in the three-dimensional model from the main memory in response to the identification of the group of the objects.

13. The apparatus of claim 11, wherein in outputting the attributes, the product visualization system sends the attributes needed to display objects to a rendering system, wherein the rendering system displays the objects on the display system using the attributes that indicate a display state of the objects.

14. The apparatus of claim 11, wherein the product visualization system displays all of the objects associated with the three-dimensional model of the product.

15. The apparatus of claim 11, wherein the product visualization system receives the user input, wherein the user input is selected from at least one of a string identifying the portion of the product, a visual selection of the portion of the product, a selection of a group of shop orders indicating a status of an installation of a group of parts in the product, a selection of a position of the product from positions in which the product is assembled, or defining a clipping box.

16. The apparatus of claim 11, wherein the policy identifies the objects that are visible in the three dimensional model based on a position of the product in an assembly process.

17. The apparatus of claim 11, wherein the product visualization system places a portion of the objects in a buffer.

18. The apparatus of claim 11, wherein the three-dimensional model is a massive model.

19. The apparatus of claim 11, wherein the product visualization system is located on a computer in the computer system and further comprising:
a database, wherein the three-dimensional model is stored in the database and the database is located in a location selected from one of the computer or a remote computer in the computer system.

20. The apparatus of claim 11, wherein the product is selected from one of an aircraft, a surface ship, a vehicle, a train, a spacecraft, a building, a manufacturing facility, a power plant, a bridge, an engine, computer network nodes, and a wing.

21. A product management system that comprises:
a product visualization system in communication with a display system, wherein the product visualization system accesses a three-dimensional model of a product located in a database in a computer system, wherein the three-dimensional model:
comprises at least 650 million polygons;
includes objects and a spatial relationship of the objects to each other;
identifies a group of the objects in the three-dimensional model to be displayed on the display system in the computer system based on a policy applied to a user input selecting a portion of the product, such that the policy comprises an object identification based upon at least one of a group comprising: a condition of an assembly, a status of workshop orders identifying a status of parts represented by the group of objects in the portion of the produce, and a condition of assembly of parts in the portion;
assigns a value to a group of attributes associated with the group of the objects, wherein the value assigned to the group of the attributes indicates that the group of the objects is to be displayed on the display system, and wherein other objects in the objects having the attributes without the value are not displayed; and
outputs, based upon the attributes associated with the objects in which the attributes are used to display the group of the objects in three dimensions on the display system, the attributes in which the group of the objects is displayed without at least one of: loading the objects in the three-dimensional model from the database into a main memory, or unloading the objects in the three-dimensional model from the main memory in response to the identification of the group of the objects, at a visualization rate, of the three-dimensional model of the product on the display system, of at least ten frames per second.

* * * * *

UNITED STATES PATENT AND TRADEMARK OFFICE
CERTIFICATE OF CORRECTION

PATENT NO. : 10,176,520 B2
APPLICATION NO. : 14/793240
DATED : January 8, 2019
INVENTOR(S) : Kasik et al.

Page 1 of 1

It is certified that error appears in the above-identified patent and that said Letters Patent is hereby corrected as shown below:

In the Claims

Column 18 (Line 39) following "portion of the" and proceeding "and a condition" herein change "produce" to read as "product"

Signed and Sealed this
Eighteenth Day of June, 2019

Andrei Iancu
*Director of the United States Patent and Trademark Office*